United States Patent
Andrä

(10) Patent No.: US 6,846,240 B2
(45) Date of Patent: Jan. 25, 2005

(54) TORSIONALLY FLEXIBLE SHAFT COUPLING

(75) Inventor: Rainer Andrä, Limburg (DE)

(73) Assignee: SGF Suddeutsche Gelenkscheibenfabrik GmbH & Co. KG, Waldkraiburg (DE)

( * ) Notice: Subject to any disclaimer, the term of this patent is extended or adjusted under 35 U.S.C. 154(b) by 6 days.

(21) Appl. No.: 10/664,026

(22) Filed: Sep. 12, 2003

(65) Prior Publication Data

US 2004/0058736 A1 Mar. 25, 2004

Related U.S. Application Data

(63) Continuation of application No. PCT/EP02/02871, filed on Mar. 14, 2002.

(30) Foreign Application Priority Data

Mar. 14, 2001 (DE) .......................................... 101 12 260

(51) Int. Cl.[7] ................................................. F16D 3/74
(52) U.S. Cl. ............................ 464/83; 464/93; 464/905
(58) Field of Search .............................. 464/54, 82, 83, 464/88, 92, 93, 97, 111, 137, 138, 904, 905, 906

(56) References Cited

U.S. PATENT DOCUMENTS

| | | | |
|---|---|---|---|
| 1,455,242 A | | 5/1923 | Corgiat, Jr. et al. |
| 1,694,064 A | | 12/1928 | Jencick |
| 2,504,750 A | * | 4/1950 | Strachovsky ................. 464/93 |
| 2,834,226 A | * | 5/1958 | Hirst |
| 3,106,076 A | | 10/1963 | Bastow |
| 3,318,108 A | | 5/1967 | Cadiou |
| 3,372,561 A | * | 3/1968 | Howard et al. ............ 464/83 X |
| 4,031,714 A | * | 6/1977 | Faust ......................... 464/83 X |
| 5,279,522 A | * | 1/1994 | Rouillot et al. ............. 464/111 |
| 5,741,187 A | | 4/1998 | Wolf et al. |
| 6,068,555 A | | 5/2000 | Andra et al. |
| 6,176,784 B1 | | 1/2001 | Albers |

FOREIGN PATENT DOCUMENTS

| | | | |
|---|---|---|---|
| BE | 546262 | * 10/1959 | .................. 464/83 |
| DE | 1928990 | 2/1971 | |
| DE | 3942432 C1 | 5/1991 | |
| DE | 4217332 A1 | 12/1993 | |
| DE | 19531201 A1 | 2/1997 | |
| DE | 19727321 A1 | 11/1998 | |
| EP | 0563940 A2 | 10/1993 | |

* cited by examiner

Primary Examiner—Greg Binda
(74) Attorney, Agent, or Firm—Clifford W. Browning; Woodard, Emhardt, Moriarty, McNett & Henry LLP

(57) ABSTRACT

Disposed around a universal joint (12), which comprises a first and a second substantially rigid joint body (14, 28), is a rim (40) of loop-shaped flexible coupling elements (42), which are each looped around one first molded piece (50) and one second molded piece (52). The first molded pieces (50) are connected rigidly to a flange (22) on the first joint body (14) and disposed between second molded pieces (52). The second molded pieces (52) are connected firmly to a counter-flange (34), which forms part of a rotational body (62). The latter forms one end of a torque transmission chain, the other end of which is the second joint body (28). The first joint body (14) has a tubular piece (16), which encloses the second joint body (28) and has an outer lateral surface (18) of circular cross section, against which the flexible coupling elements (42) are supported in radial direction.

9 Claims, 4 Drawing Sheets

TORSIONALLY FLEXIBLE SHAFT COUPLING

The present application is a continuation of prior PCT Application No. PCT/EP02/02871, filed Mar. 14, 2002.

The invention relates to a torsionally flexible shaft coupling.

BACKGROUND OF THE INVENTION

Such a shaft coupling is known from EP 0 563 940 A. There, the universal joint is a cross journal pivot joint having a diametrically continuous first joint pin, which is mounted rotatably on a first fork-shaped shaft end, and a centrally interrupted second joint pin, the halves of which are rigidly connected to one another by a tubular intermediate piece and mounted rotatably in a second fork-shaped shaft end. The first joint pin extends with radial play through the tubular intermediate piece between the two halves of the second joint pin, so that the two joint pins are movable relative to one another by a limited angle in relation to the central axis of the universal joint. The pins extend in radial direction away from the central joint axis out beyond their bearing arrangements and there form bearing journals, on each of which one of altogether four anchor blocks is mounted. Formed on each of said anchor blocks on either side of the associated bearing journal is a semicircular moulded piece. Each moulded piece thus associated with the first joint pin is connected to an adjacent moulded piece associated with the second joint body by a flexible coupling element, which has a reinforcing insert embedded in an elastomer and wound around said two moulded pieces. The coupling elements, and hence also their reinforcing inserts, each lie substantially in a tangential plane parallel to the central axis of the universal joint.

When said known shaft coupling has to transmit a torque in one direction, each second one of the altogether four coupling elements is subject to tensile stress; the two associated moulded pieces in said case move in peripheral direction away from one another, with the result that said coupling elements are also subject to bending moments, wherein the individual windings of their reinforcing inserts are loaded very differently and tend to cut into their elastomer covering. The consequence is settling phenomena, as a result of which the force-displacement characteristic of the coupling elements changes relatively quickly and the service life of the coupling elements is limited. In order to achieve a satisfactory service life of the coupling elements, their maximum load has to be kept low, which, given the torque that is to be transmitted via the flexible shaft coupling, is possible only by making the length of the joint pins, and hence the diameter of the shaft coupling as a whole, unusually large. Alternatively or additionally it is necessary for the angular deflections of the two joint pins in relation to one another to be narrowly limited by means of mechanical stops. Such a limitation is achieved in the torsionally flexible shaft coupling known from EP 0 563 940 A by means of the limited play of the continuous joint pin in the tubular intermediate piece of the subdivided second joint pin.

The same applies to other cross journal pivot joints, which are known from U.S. Pat. No. 3,106,076 A or DE 19 28 990 A and likewise have joint pins, which are movable at an angle relative to one another and supported against one another via centrally disposed elastomer bodies. The latter are rapidly destroyed during operation under high torque load.

From DE 42 17 332 A, a tripod joint is known, which comprises a tubular first joint body, which is fastened to a first shaft and has paraxial webs on its inner side, as well as a second joint body in the form of a spider, which is fastened to a second shaft and on each arm of which a roller is mounted rotatably about a radial axis. The rollers run in channel-shaped races, which are inserted in each case between two of the paraxial webs of the first joint body and supported against them by flexible support bodies. These too are incapable of withstanding high torque loads of the joint for a sufficiently long period if they are made of an elastomer that is non-rigid enough to effect adequate vibration isolation.

Front-wheel drives of motor vehicles require shaft couplings that enable large angular deflections of 30 degrees and more and at the same time take up little installation space, above all in radial direction. Said requirements are met by known rigid cross journal joints, tripod joints and cage-controlled constant-velocity pivot joints, which however all have the drawback of virtually undamped transmission of vibrations. In order to eliminate disturbing vibrations, an axial in-line arrangement of such joints and flexible joint discs has therefore been attempted. This leads however to double joint arrangements, in which a torque-transmitting component, e.g. shaft piece, is not adequately guided between the rigid universal joint and the flexible joint disc and may consequently cause an unbalance, which in turn generates disturbing vibrations.

SUMMARY OF THE INVENTION

The underlying object of the invention is therefore to provide a torsionally flexible shaft coupling, which is particularly suitable for front-wheel drives of motor vehicles and which, given the torque that is to be transmitted, takes up little installation space and even at high rotational speeds operates substantially free from unbalance.

The object is achieved according to the invention by the features of a centrally disposed universal joint 12, which has a first and a second substantially rigid joint body 14, 28, a rim 40, disposed around the universal joint 12, of loop-shaped flexible coupling elements 42, which are each looped around one first moulded piece 50 and one second moulded piece 52, wherein the first moulded pieces 50 are connected substantially rigidly to the first joint body 14 and disposed between second moulded pieces 52, and the joint bodies 14, 28 as well as the coupling elements 42 are disposed substantially rotationally symmetrically in relation to a common joint axis A as well as substantially symmetrically in relation to a common center plane B normal to the joint axis A and are arranged in line for the transmission of torques, characterized in that the first joint body 14 has a first flange 22, to which the first moulded pieces 50 are firmly connected and from which they extend parallel to the joint axis A, the second moulded pieces 52 are firmly connected to a counter-flange 34 and extend from it parallel to the joint axis A, the counter-flange 34 forms part of a rotational body 62, which forms one end of a torque transmission chain, the other end of which is the second joint body 28, and the first joint body 14 comprises a tubular piece 16, which encloses the second joint body 28 and has an outer lateral surface 18 of circular cross section, against which the flexible coupling elements 42 are supposed in radial direction and further characterized in that the first moulded pieces 50 are disposed on the first flange 22 and the second moulded pieces 52 are disposed on the counter-flange 34 in each case in pairs, and each moulded piece 50, 52 is connected only to a single other moulded piece 52, 50 by a flexible coupling element 42, so that all of the coupling elements 42 are interlinked without overlapping.

A torsionally flexible shaft coupling according to the invention may be composed of a universal joint of a conventional design, in particular of a standard cross journal joint, tripod joint or cage-controlled constant-velocity pivot joint, on the one hand, and a number of likewise conventional flexible coupling elements plus associated moulded pieces, on the other hand. It is therefore perfectly possible to use components that have proved their worth in production vehicles and may be manufactured at low cost. What is achieved by the invention is i.a. that the first flange is centred in relation to the counter-flange, and hence two rotational bodies, in particular shafts, connected to one another by a shaft coupling according to the invention for the purpose of torque transmission are centred in relation to one another and yet remain acoustically isolated from one another, even with regard to high-frequency radial vibrations. Furthermore, the flexible coupling elements even upon transmission of high torques are not significantly subject to bending stress but are subject substantially only to tensile stress.

In the case of the shaft couplings known from FIGS. 2 and 4 of EP 0 563 940 A it is admittedly also already ensured that the mutually connected shafts are centred in relation to one another but this is effected by means of a metal spigot mounting on the intersecting joint pins; said spigot mounting is not suitable for acoustic isolation.

Advantageous developments of the invention arise from the sub-claims:

The sliding blocks of the present invention guarantee that the mutual centering of the two flanges remains substantially free of wear even when the shafts or other rotational bodies that are connected to one another by the shaft coupling according to the invention execute torsional vibrations of high amplitude and/or high frequency in relation to one another.

In the development of the present invention the tubular piece of the first joint body in a particularly space-saving manner has a dual function, namely inside as a component of the—substantially torsionally rigid—universal joint, and outside as a component of the described centring device.

Whereas in the shaft coupling with a modified cross journal joint known from EP 0 563 940 A the rim of flexible coupling elements comprises only four such elements disposed successively in peripheral direction, a greater number of flexible coupling elements is provided in the arrangement according to the invention.

Thus, a relatively large installation space for a universal joint of an appropriately high loading capacity is kept free radially at the inside of the flexible coupling elements.

The features of the present invention likewise serve the purpose of keeping free a large enough installation space inside the rim of flexible coupling elements to accommodate a universal joint of a high loading capacity.

The development of the present invention guarantees that all of the flexible coupling elements are, and remain disposed with the requisite accuracy symmetrically relative to the common centre plane, normal to the joint axis, of the universal joint and of the rim of flexible coupling elements. In the shaft coupling known from EP 0 563 940 A this is not guaranteed owing to dimensional inaccuracies of the flexible coupling elements that are not always avoidable and to dimensional changes of the flexible coupling elements that occur during operation.

The configuration of the moulded pieces according to the present invention facilitates manufacture and assembly of the rim of loop-shaped flexible coupling elements.

Finally, the configuration and arrangement of the flanges of the present invention has proved particularly easy to install and space-saving.

Two embodiments of the invention are described below with further details with reference to diagrammatic drawings. Said drawings show in:

DETAILED DESCRIPTION OF THE PREFERRED EMBODIMENTS

Figure 1:
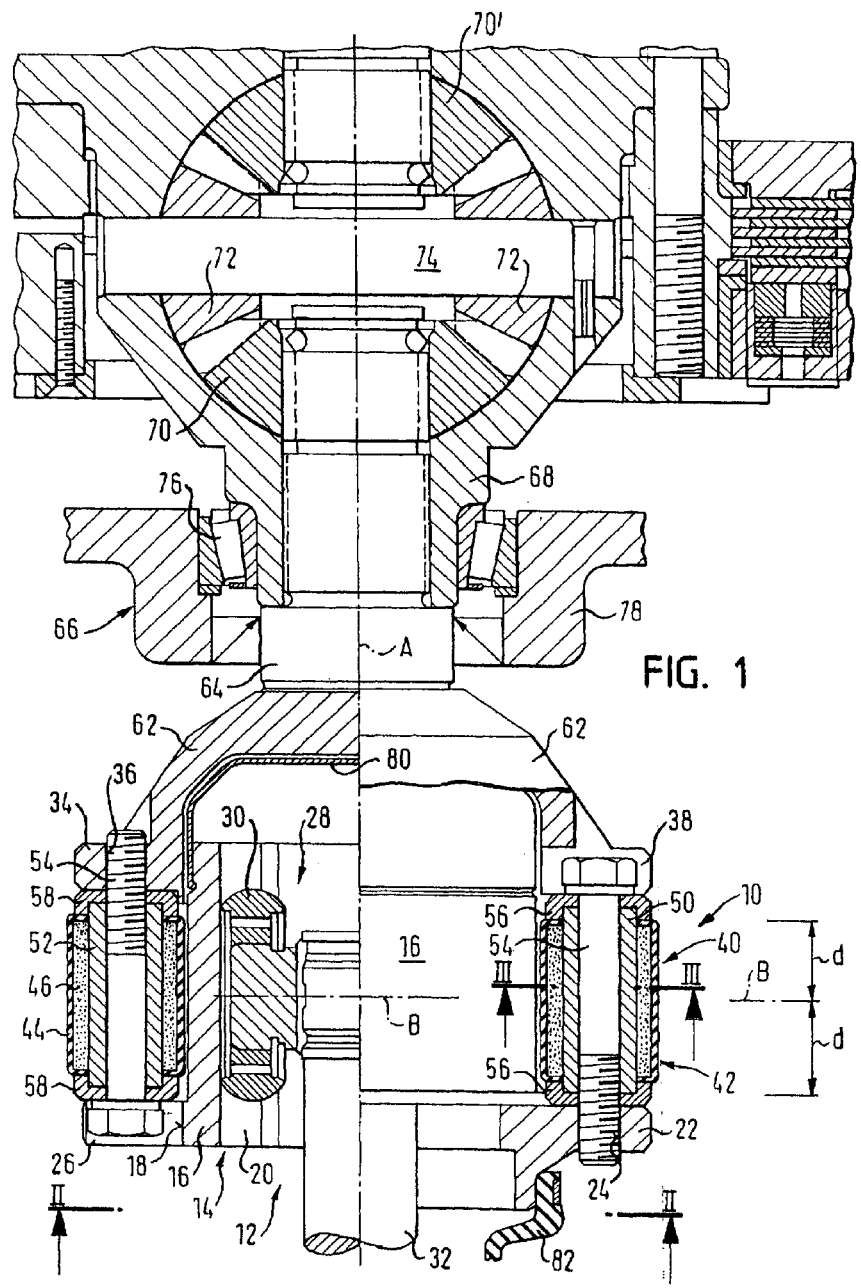
FIG. 1 an axial section of a first torsionally flexible shaft coupling according to the invention, which is installed in a front-wheel drive of a motor vehicle.
Figure 2:
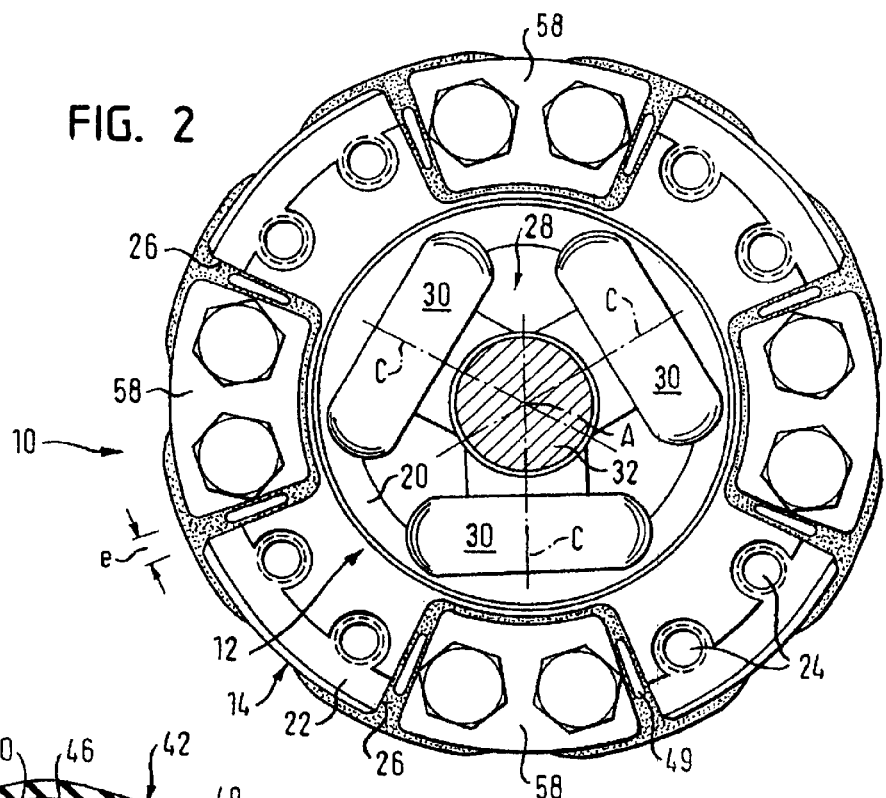
FIG. 2 the cross section II—II in FIG. 1.

The illustrated torsionally flexible shaft coupling 10 comprises a universal joint 12 of a conventional design; as an example thereof, a tripod joint is shown in FIGS. 1 and 2. This has a radially outer first joint body 14, which defines a joint axis A as well as a center plane B normal thereto and is formed substantially from a tubular piece 16 having a circular-cylindrical outer lateral surface 18 and inner races 20 parallel to the joint axis A, as well as from a first flange 22, which extends radially outwards from the tubular piece 16 and has four pairs of threaded bores 24 offset at angular intervals of 90 degrees from one another as well as ring-sector-shaped cutouts 26 disposed therebetween.

The universal joint 12 further comprises a second joint body 28, the axis of which in the absence of deflection coincides with the joint axis A, as shown in FIG. 1. The second joint body 28 has the shape of a spider; mounted thereon are three rolling bodies 30, in the illustrated example rollers, which are each freely rotatable about a radial axis of rotation C. A shaft 32, which in the illustrated example is a front-wheel drive shaft, is fastened rigidly to the second joint body 28.

Situated coaxially opposite the first flange 22 is a counter-flange 34 of a substantially identical construction; the counter-flange 34 therefore likewise has four pairs of threaded bores 36 and ring-sector-shaped cutouts 38 disposed therebetween but is rotated through 45 degrees relative to the first flange 22. Thus, each pair of threaded bores 24 of the first flange 22 lies axially opposite one of the cutouts 38 of the counter-flange 34, and conversely each pair of threaded bores 36 of the counter-flange 34 lies axially opposite one of the cutouts 26 of the first flange 22.

Disposed between the two flanges 22 and 34 is a rim 40 of eight loop-shaped flexible coupling elements 42, each of which has a reinforcing insert 46 embedded in an elastomer 44. The coupling elements 42 are completely identical to one another; they may be manufactured individually and then assembled or be combined from the start by the elastomer 44 into the rim 40. The reinforcing insert 46 of each coupling element 42 is wound from textile tape or yarn or from metal wire, has an oval shape and is stiffened by means of a centrally disposed transverse web 48 of elastomer, which extends radially in relation to the joint axis A and, as is illustrated above all in FIG. 3, may be interrupted by a likewise radial, central cutout 49.

Embedded in each of the coupling elements 42 are one first moulded piece 50 and one second moulded piece 52, which are both tubular pieces extending in a direction parallel to the joint axis A. Their cross section in or parallel to the center plane B is roughly semicircular. Each of the moulded pieces 50 and 52 has a through-hole 53 parallel to the joint axis A for a screw 54. According to FIG. 3 the moulded pieces 50 and 52 embedded in each case in a common coupling element 42 are disposed in such a way that their semicircular edges are remote from one another in peripheral direction of the rim 40 and their mutually opposing straight edges lie in each case on a radius in relation to the joint axis A and between them enclose the transverse web 48 of the relevant coupling element 42.

The joint bodies 14, 28 as well as the coupling elements 42 are disposed substantially rotationally symmetrically in relation to a common joint axis A as well as substantially symmetrically in relation to a common center plane B normal to the joint axis A and are arranged in line for the transmission of torques.

All of the first moulded pieces 50 are fastened to the first flange 22 in each case by a screw 54 inserted into one of the threaded bores 24, while all of the second moulded pieces 52 are fastened to the counter-flange 34 in each case by a screw 54 inserted into one of the threaded bores 36. In said case, each of the first moulded pieces 50 is clamped between two first covers 56, while each of the second moulded pieces 52 is clamped between two second covers 58. All of the first covers 56 and all of the first moulded pieces 50 are therefore fastened rigidly to the first flange 22 and hence associated with the first joint body 14, while all of the second covers 58 and all of the second moulded pieces 52 are fastened rigidly to the counter-flange 34. Paired first covers 56 and/or 58 are disposed at identical distances d from the centre plane B. All of the covers 56 and 58 are mutually identical extruded parts made from steel sheet.

Each of the coupling elements 42 connects the first flange 22 to the counter-flange 34 and, viewed in the direction of the joint axis A, approximately one half of its two end faces is covered by the two associated first covers 56, while approximately the second half of its two end faces, on the other hand, is covered by the two associated second covers 58. The first covers 56 and also the second covers 58 are delimited in peripheral direction by, in relation to the joint axis A, radial edges in such a way that between each first cover 56 and the two adjacent second covers 56 in the illustrated normal position of the shaft coupling there is in each case a clearance e, which determines the maximum angular deflection of the flanges 22 and 34 in relation to one another.

Figure 3:
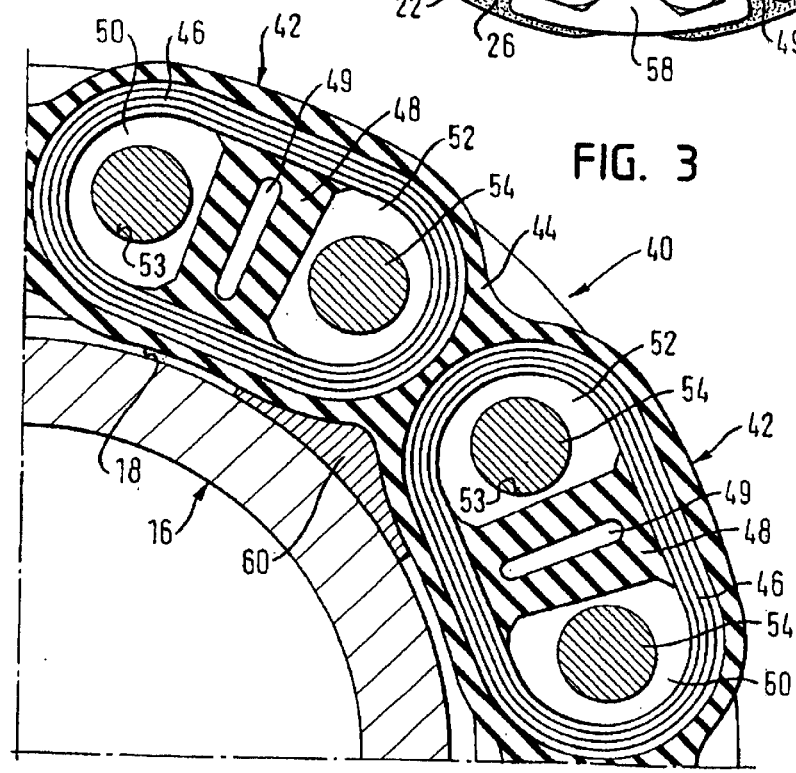
FIG. 3 the partial cross section III—III in FIG. 1 to an enlarged scale.

As is evident likewise from FIG. 3, each of the coupling elements 42 in the region radially inside of each pair of second moulded pieces 52 is supported in radial direction against the first joint body 14 by means of a sliding block 60. The sliding blocks 60 are manufactured from a material having good sliding properties, e.g. polyamide, and viewed in the direction of the joint axis A have a profile, which radially at the inside is formed by an arc complementary to the lateral surface 18 of the tubular piece 16 and otherwise roughly corresponds to a Gaussian distribution curve (bell curve), so that each sliding block 60 supports two mutually adjacent flexible coupling elements 42 in the region of their second moulded pieces 52 and enables them to slide virtually without friction in peripheral direction along the lateral surface 18. Thus, the coupling elements 42 are protected from wear even when the shaft coupling is loaded with the maximum occurring torques and said torques alter their direction with a high frequency. The sliding blocks 60 are each inserted into a gusset radially inside of the associated pair of second moulded pieces 52 and are vulcanized together with the rim 40 of coupling elements 42.

The counter-flange 34 is a component part of a bell-shaped rotational body 62 that is fastened to, or integrally formed on, the end of an axle journal 64 of a differential gear 66, and which forms one end of a torque transmission chain, the other end of which is the second joint body 28. The differential gear 66 is of a conventional design and has a planet carrier 68, inside which is disposed a conical central wheel 70, which is fastened on the axle journal 64 and is in constant mesh with two planet wheels 72 journalled on a common axle 74 that is fixed to the planet carrier 68 and extends transversely to the joint axis A. The two planet wheels 72 are moreover in constant mesh with a further conical central wheel 70' disposed axially opposite the said central wheel 70. The planet carrier 68 is supported by means of taper roller bearings 76, of which only one is shown in FIG. 1, in a gear housing 78 so as to be rotatable about the joint axis A.

The tubular piece 16 of the first joint body 14 is closed off at its end disposed inside the bell-shaped rotational body 62 by means of a cap 80 and connected at its opposite end by means of a gaiter 82 in a sealed manner to the shaft 32, which is associated with the second joint body 28.

Figure 4:
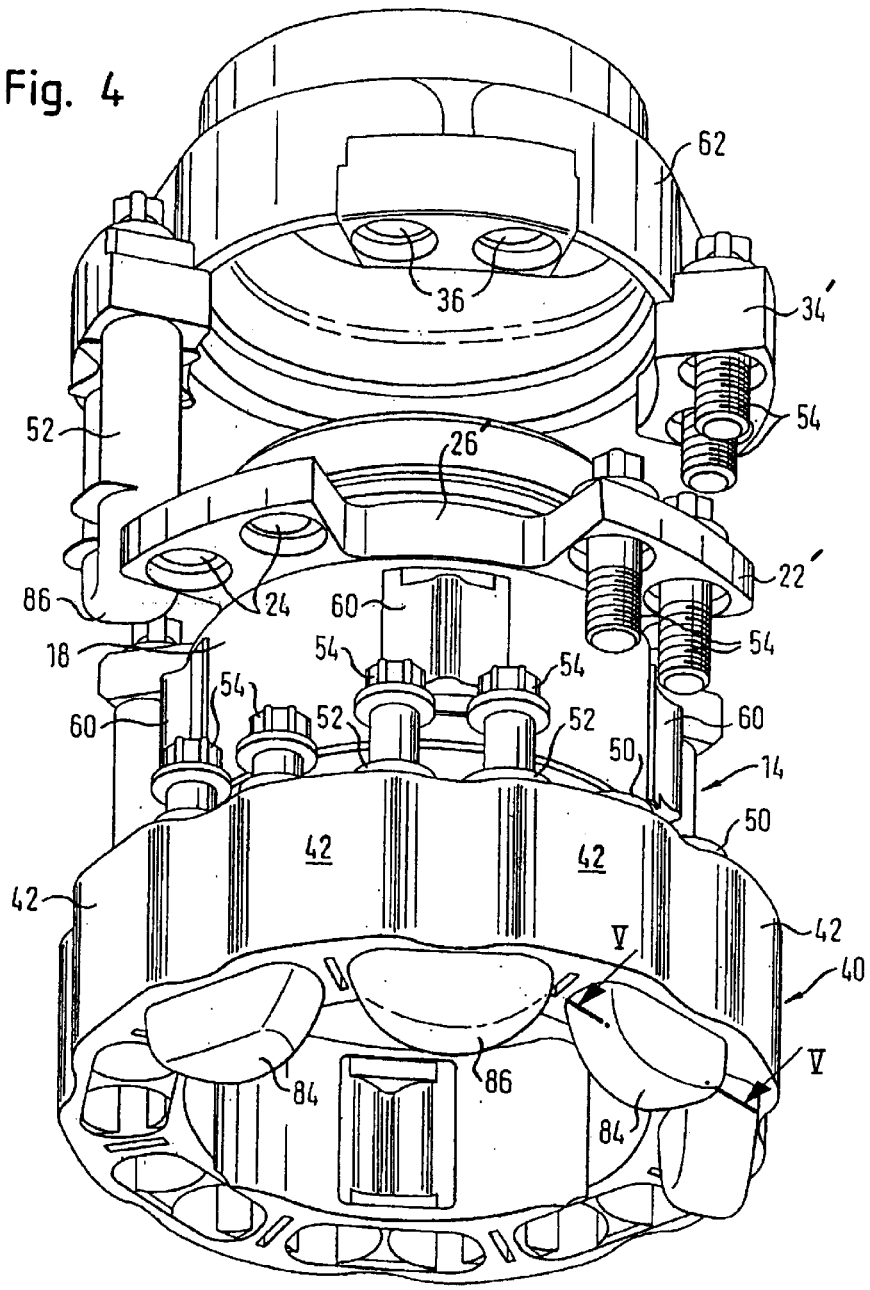
FIG. 4 a perspective view of a second torsionally flexible shaft coupling according to the invention, the components of which are partially separated and disassembled from one another in axial direction, and FIG. 5 the partial section V—V in FIG. 4.
Figure 5:
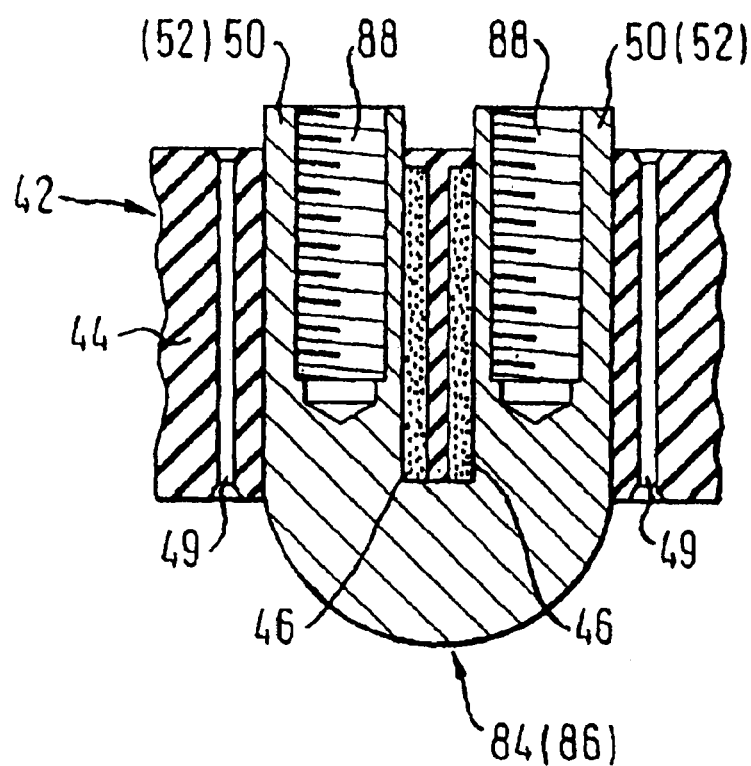

FIGS. 4 and 5 show a further example of a shaft coupling according to the invention, which differs from the example illustrated in FIGS. 1 to 3 above all in that the first flange 22' in each of its ring-sector-shaped cutouts 26' receives a correspondingly ring-sector-shaped portion of the counter-flange 34', so that both flanges 22' and 34' lie substantially in a common plane normal to the joint axis A. Each of the ring-sector-shaped portions of the counter-flange 34' extends over a smaller angular range than the receiving cutout 26' of the first flange 22'; consequently, as in the example illustrated in FIGS. 1 to 3, said two flanges are rotatable to a limited extent relative to one another.

According to FIGS. 4 and 5 a further difference from the embodiment illustrated in FIGS. 1 to 3 is that each pair of associated first moulded pieces 50 are combined in a first U-shaped bracket 84, and each pair of associated second moulded pieces 52 are combined in a second U-shaped bracket 86, thereby facilitating the manufacture and assembly of the rim 40 of—again eight—loop-shaped flexible coupling elements 42. Each of the moulded pieces 50 and 52 thus combined into pairs has a threaded hole 88 for the associated screw 54 for fastening to the first flange 22' and/or to the counter-flange 34'. In the illustrated example, all of the brackets 84 and 86 are made of steel and are completely identical to one another.

The screws 54 are inserted according to FIG. 4 from right to left through the paraxial holes 24 and 26', in the present case through-holes, formed in the flanges 22' and 34' respectively, screwed into the threaded holes 88 of the moulded pieces 50 and 52 respectively and tightened. Thus, the rim 40 of flexible coupling elements 42 is held with its, in FIG. 3, right face lying against the two flanges 22' and 34'.

What is claimed is:

1. Torsionally flexible shaft coupling (10) comprising
a centrally disposed universal joint (12), which has a first and a second substantially rigid joint body (14, 28),
a rim (40), disposed around the universal joint (12), of loop-shaped flexible coupling elements (42), which are each looped around one first moulded piece (50) and one second moulded piece (52), wherein the first moulded pieces (50) are connected substantially rigidly to the first joint body (14) and disposed between second moulded pieces (52), and the joint bodies (14, 28) as well as the coupling elements (42) are disposed substantially rotationally symmetrically in relation to a common joint axis (A) as well as substantially symmetrically in relation to a common center plane (B) normal to the joint axis (A) and are arranged in line for the transmission of torques, characterized in that the first joint body (14) has a first flange (22), to which the first moulded pieces (50) are firmly connected and from which they extend parallel to the joint axis (A), the second moulded pieces (52) are firmly connected to a counter-flange (34) and extend from it parallel to the joint axis (A), the counter-flange (34) forms part of a rotational body (62), which forms one end of a torque transmission chain, the other end of which is the second joint body (28), and the first joint body (14) comprises a tubular piece (16), which encloses the second joint body (28) and has an outer lateral surface (18) of circular cross section, against which the flexible coupling elements (42) are supported in radial direction, and further characterized in that the first moulded pieces (50) are disposed on the first flange (22) and the second moulded pieces (52) are disposed on the counter-flange (34), in each case in pairs, and each moulded piece (50, 52) is connected only to a single other moulded piece (52, 50) by a flexible coupling element (42), so that all of the coupling elements (42) are interlinked without overlapping.

2. Shaft coupling according to claim 1, characterized in that the flexible coupling elements (42) are supported in the region of the second moulded pieces (52) in each case via a sliding block (60) against the lateral surface (18) of the tubular piece (16) of the first joint body (14).

3. Shaft coupling according to claim 1, characterized in that the tubular piece (16) on its inner side has races (20) for rolling bodies (30), which form part of the universal joint (12) in the form of a multipod- or constant-velocity joint.

4. Shaft coupling according to claim 1, characterized in that around the tubular piece (16) of the first joint body (14) at least six coupling elements (42) are disposed successively in peripheral direction.

5. Shaft coupling according to claim 4, characterized in that the first moulded pieces (50) are fastened in each case between two first covers (56) and the second moulded pieces (52) are fastened in each case between two second covers (58) to the associated flange (22, 34), wherein all of the covers (56, 58) are disposed parallel to the centre plane (B), and paired covers (56, 58) are at identical distances (d) from the center plane (B).

6. Shaft coupling according to claim 4, characterized in that each pair of first moulded pieces (50) forms a U-shaped first bracket (84), and each pair of second moulded pieces (52) forms a U-shaped second bracket (86).

7. Shaft coupling according to claim 6, characterized in that each of the moulded pieces (50, 52) has a threaded hole (88) for fastening to the associated flange (22) and/or counter-flange (34).

8. Shaft coupling according to one of claims 1 to 4 or 5 to 7, characterized in that the first flange (22) and the counter-flange (34) have ring-sector-shaped cutouts (26, 38), of which the cutouts (26) of the first flange (22) are offset by an angle of rotation from the cutouts (38) of the counter-flange (34).

9. Shaft coupling according to claim 8, characterized in that the first flange (22) engages with rotational play into the cutouts (38) of the counter-flange (34), and vice versa, so that both flanges (22, 34) lie in a common plane.

* * * * *